United States Patent
Murakami et al.

(10) Patent No.: US 7,312,930 B2
(45) Date of Patent: Dec. 25, 2007

(54) ZOOM LENS

(75) Inventors: Kazuya Murakami, Tokyo (JP); Yasuhiko Abe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/304,957

(22) Filed: Dec. 14, 2005

(65) Prior Publication Data

US 2006/0126191 A1 Jun. 15, 2006

(30) Foreign Application Priority Data

Dec. 14, 2004 (JP) ............................. 2004-361588

(51) Int. Cl.
*G02B 15/14* (2006.01)
(52) U.S. Cl. .................. 359/682; 359/680; 359/689
(58) Field of Classification Search ................ 359/680, 359/682, 689
See application file for complete search history.

(56) References Cited

U.S. PATENT DOCUMENTS 6,349,002 B1 * 2/2002 Shibayama et al. ......... 359/689
6,757,111 B2 * 6/2004 Takeuchi et al. ............ 359/784
6,813,091 B2 * 11/2004 Nanba ........................ 359/689

FOREIGN PATENT DOCUMENTS

JP 2003-177314 A 6/2003
JP 2003-177315 A 6/2003

* cited by examiner

*Primary Examiner*—David N. Spector
(74) *Attorney, Agent, or Firm*—Darby & Darby P.C.

(57) ABSTRACT

A zoom lens includes a first lens unit having a negative refractive power, a second lens unit having a positive refractive power, and a third lens unit having a positive refractive power. The first, second, and third lens units are arranged in that order from an object side to an image plane side of the zoom lens. The first lens unit includes a first lens having a negative refractive power, the second lens unit includes a second lens having a positive refractive power and a third lens having a negative refractive power, and the third lens unit includes a fourth lens having a positive refractive power. During zooming from a wide-angle end to a telephoto end, the first lens unit is fixed, and the second lens unit and the third lens unit are moved.

10 Claims, 12 Drawing Sheets

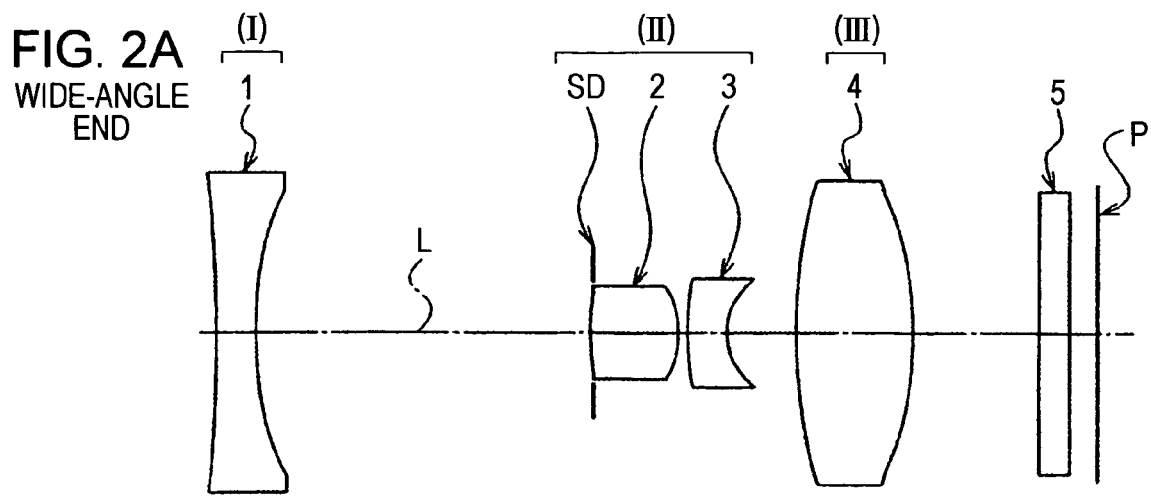
FIG. 2A WIDE-ANGLE END
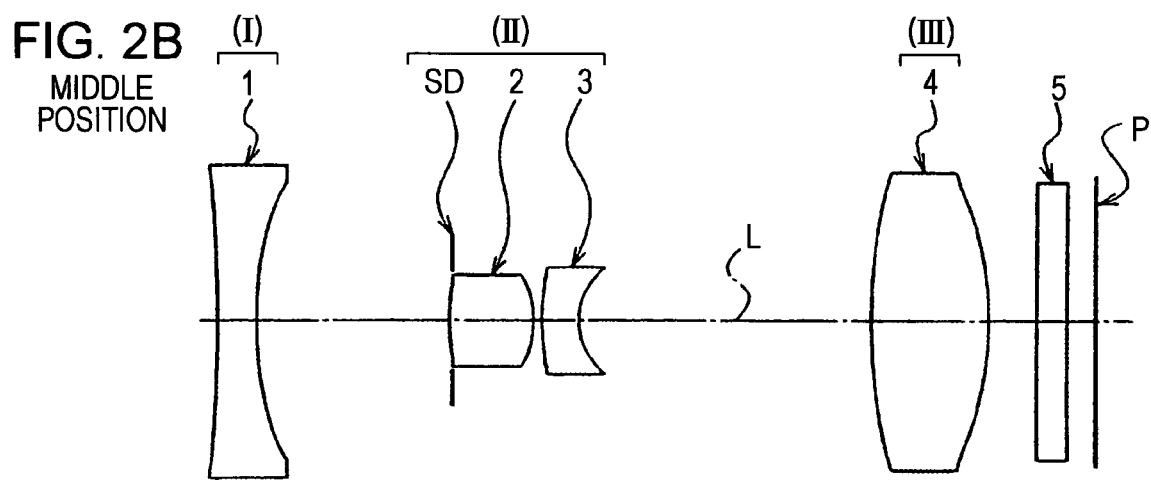
FIG. 2B MIDDLE POSITION
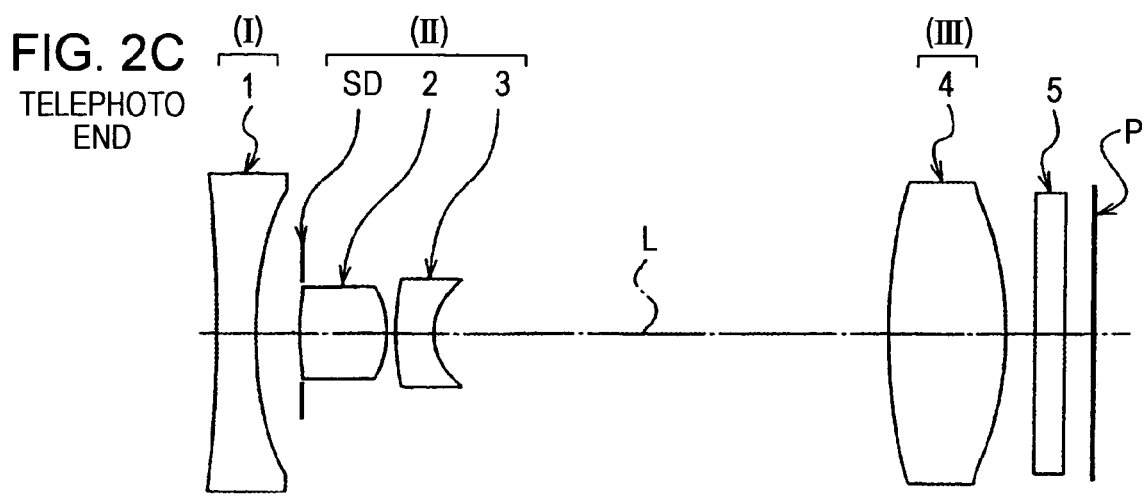
FIG. 2C TELEPHOTO END

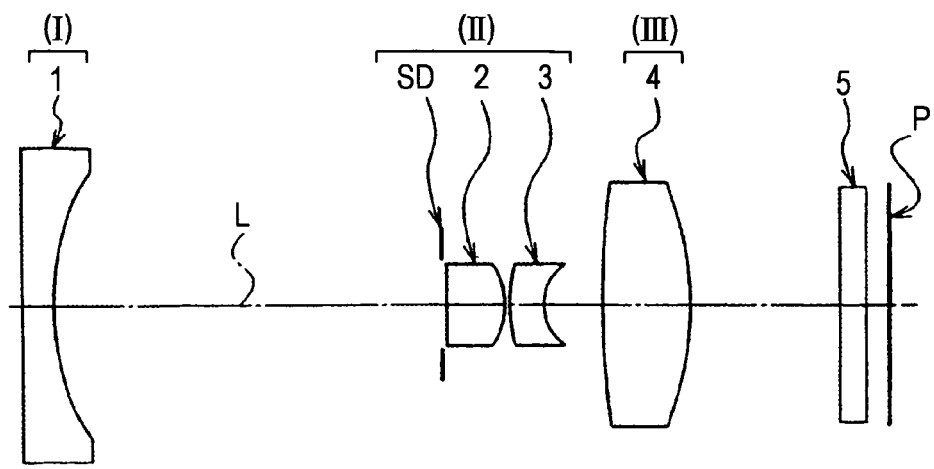
FIG. 7A WIDE-ANGLE END
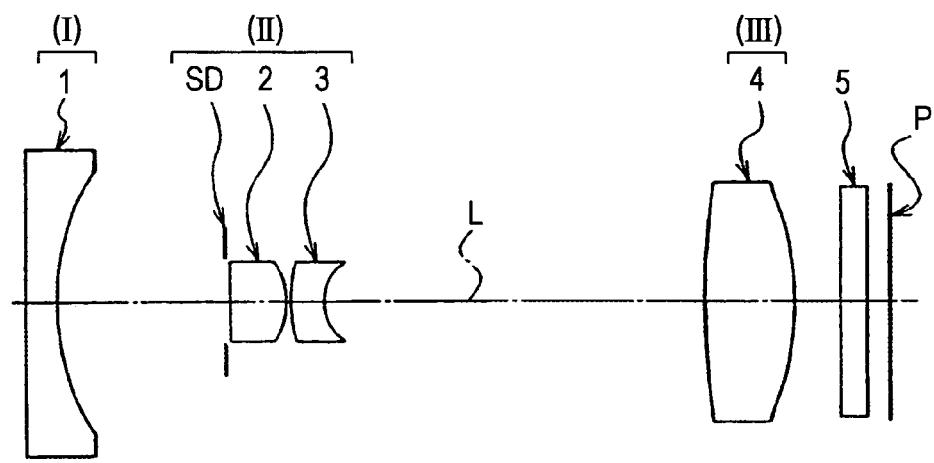
FIG. 7B MIDDLE POSITION
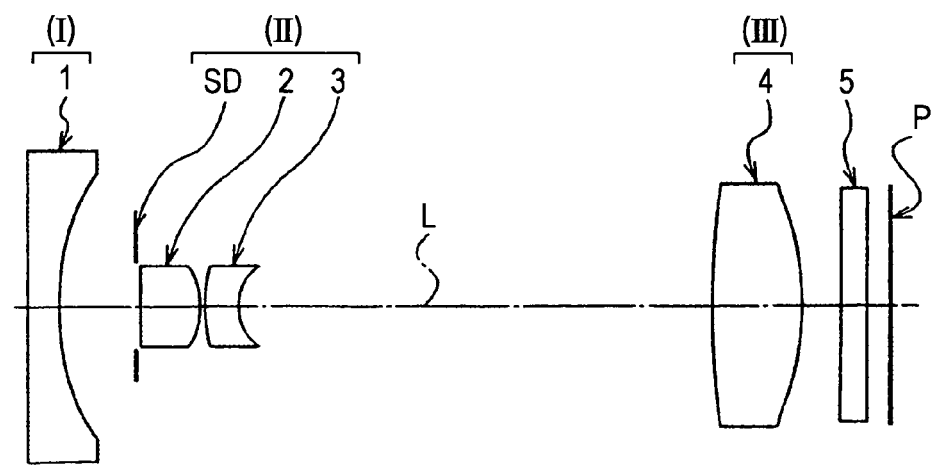
FIG. 7C TELEPHOTO END

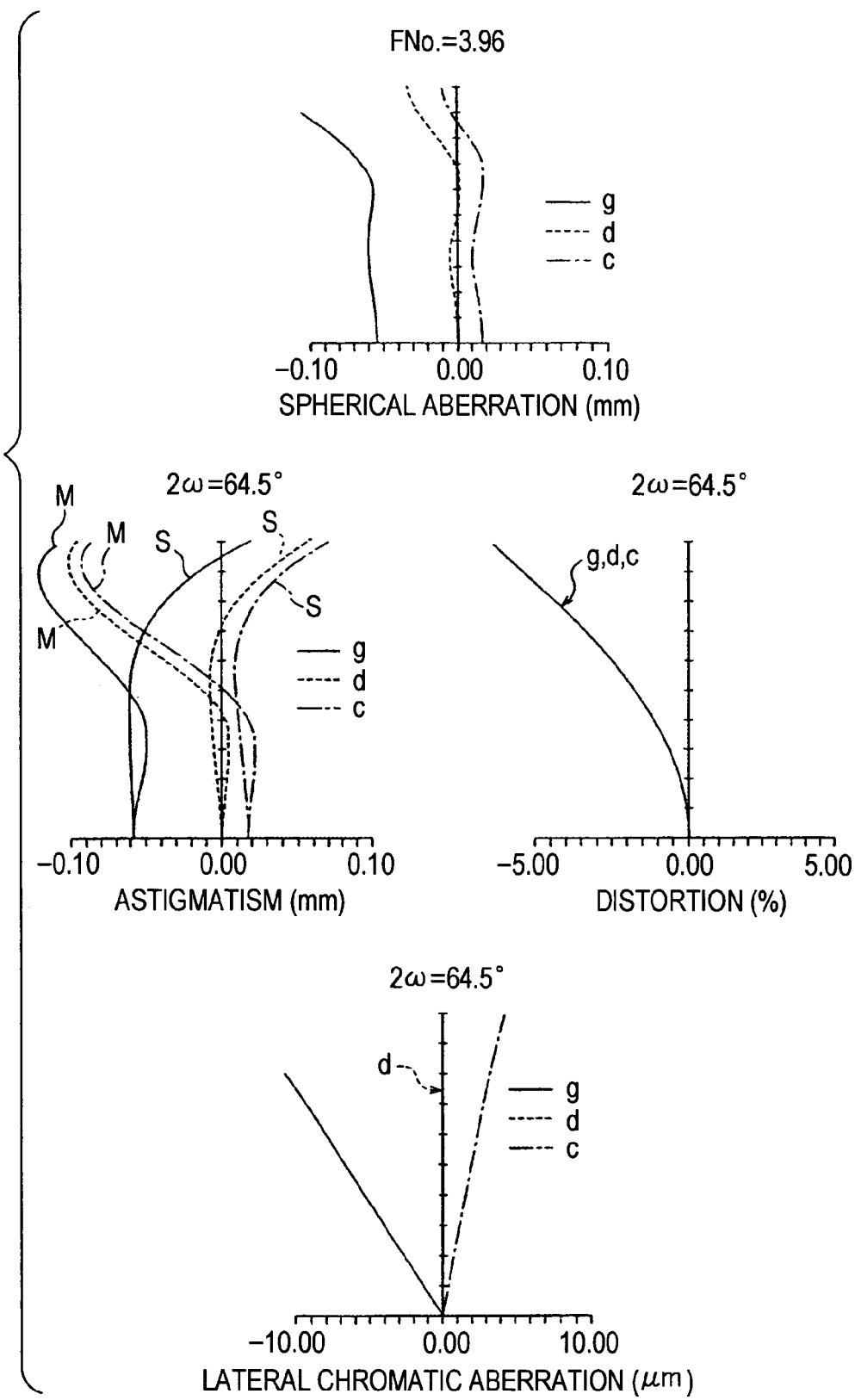

ZOOM LENS

INCORPORATION BY REFERENCE

The present application claims priority under 35 U.S.C. §119 to Japanese Patent Application No. 2004-361588 filed on Dec. 14, 2004 in Japanese. The content of the application is incorporated herein by reference in its entirety.

BACKGROUND OF THE INVENTION

1. Field of the Invention

The present invention relates to compact zoom lenses for use in digital still cameras and other devices equipped with a solid-state image sensor such as a CCD, and more particularly, to a compact zoom lens suitably used in a mobile camera mounted in or connected to, for example, a mobile telephone, a personal digital assistant (PDA), or a personal computer.

2. Description of the Related Art

Many mobile telephones equipped with a mobile camera having a solid-state image sensor, such as a CCD, have been recently found in the market, and size reduction of lenses for use in the mobile camera has been required. Moreover, a zoom lens capable of zooming from the wide-angle end to the telephoto end has been used more favorably than a single-focus lens in order to add value to the mobile telephones.

However, since the image-taking range is changed by relatively moving the lenses along the optical axis at the zoom lens, it is necessary to allow a space for the lenses to move, in addition to the space in which the lenses are arranged. This hinders size reduction.

Typical digital cameras use a collapsible barrel mechanism in a lens unit to overcome the space problem, but the collapsible barrel mechanism is easily affected by shock. Thus, it is difficult to use a similar collapsible barrel mechanism in a mobile telephone that frequently receives shock due to falling.

In order to ensure a desired zoom ratio in a limited space, all lens units in the lens system can be made movable. However, a motor and a driving mechanism mounted in the mobile telephone are required to be reduced in size and cost, compared when mounted in a popular digital camera, and therefore, it is necessary to minimize the number of movable lens units.

Accordingly, the refractive power of each lens can be increased to ensure a desired zoom ratio while the moving amount of the lens units is limited. However, when the refractive power of the lens is increased, the curvature of the lens is decreased, and correction of aberrations is difficult. Moreover, the edge thickness of the lens is insufficient, and the effective diameter of the lens is also insufficient. When the overall length of the lens system is shortened to the limit, the angle of incidence of light on the CCD differs between the wide-angle end and the telephoto end. While light is sufficiently received by the CCD at the wide-angle end, vignetting is caused by the microlens of the CCD at the telephoto end.

Japanese Unexamined Patent Application Publication No. 2003-177314 discloses a zoom lens suitable for use in a digital camera, which includes a first lens unit formed of one lens having a negative refractive power, a second lens unit formed of one lens having a positive refractive power, and a third lens unit formed of one lens having a positive refractive power. In the zoom lens, the first lens unit and the second lens unit are moved during zooming from the wide-angle end to the telephoto end.

Japanese Unexamined Patent Application Publication No. 2003-177315 discloses another zoom lens including a first lens unit formed of one lens having a negative refractive power, a second lens unit composed of two lenses respectively having a positive refractive power and a negative refractive power, and a third lens unit formed of one lens having a positive refractive power. In the zoom lens, the first lens unit and the second lens unit are moved and the third lens unit is fixed during zooming from the wide-angle end to the telephoto end so that the distance between the first lens unit and the second lens unit decreases and the distance between the second lens unit and the third lens unit increases. Further, focusing is performed by moving the first lens unit.

The zoom lens disclosed in the former publication has a three-unit three-lens structure, and this structure contributes to thickness reduction. However, since only three lenses are used, it is difficult to properly correct aberrations over the entire range from the wide-angle end to the telephoto end. It is also difficult to ensure a zoom ratio of approximately 2× or more.

The zoom lens disclosed in the latter publication can be properly corrected for aberrations because it has a three-unit four-lens structure. However, since focusing is performed by moving the first lens unit forward, there is a difficulty in shortening the overall length of the lens system. From the viewpoints of mechanical strength and reliability with respect to shock such as falling, it is not preferable to move the frontmost first lens unit during zooming or focusing.

SUMMARY OF THE INVENTION

The present invention has been made in view of the above problems, and an object of the invention is to provide a compact, slim, low-cost, and high-performance zoom lens that has a simple three-unit four-lens structure, that appropriately sets the layout and powers of lenses to correct aberrations and to ensure a zoom ratio of approximately 2.5× to 3×, and that is suitable for use particularly in a mobile camera of a mobile telephone.

A zoom lens according to an aspect of the present invention includes a first lens unit having a negative refractive power, and including a first lens having a negative refractive power, a second lens unit having a positive refractive power, and including a second lens having a positive refractive power and a third lens having a negative refractive power, and a third lens unit having a positive refractive power, and including a fourth lens having a positive refractive power. The first, second, and third lens units are arranged in that order from an object side to an image plane side of the zoom lens. The first lens unit is fixed and the second lens unit and the third lens unit are moved during zooming from a wide-angle end to a telephoto end.

While the zoom lens has a simple three-unit four-lens structure, since the second lens unit and the third lens unit are moved during zooming, aberrations are properly corrected over the entire range from the wide-angle end to the telephoto end, a zoom ratio of approximately 2.5× to 3× is ensured, and reduction of size and thickness is possible. This allows an ultra-compact zoom lens suitable for use in a mobile camera mounted in a mobile telephone.

Preferably, the following conditions (1) and (2) are satisfied:

$$4.5 < Dw1\text{-}2/Dw2\text{-}3 < 8.5 \tag{1}$$

$$Dt1\text{-}2/Dt2\text{-}3 < 0.2 \tag{2}$$

where Dw1-2 represents the distance between the first lens unit and the second lens unit at the wide-angle end, Dw2-3 represents the distance between the second lens unit and the third lens unit at the wide-angle end, Dt1-2 represents the distance between the first lens unit and the second lens unit at the telephoto end, and Dt2-3 represents the distance between the second lens unit and the third lens unit at the telephoto end.

By satisfying the above conditions (1) and (2) that specify the distances among the first, second, and third lens units at the wide-angle end and the telephoto end, the overall length of the lens system is shortened while ensuring a sufficient moving range of the lenses. Moreover, aberrations can be corrected properly.

Preferably, the following condition (3) is satisfied:

$$fg2/fw<1.5 \tag{3}$$

where fg2 represents the focal length of the second lens, and fw represents the focal length of the lens system between a front surface of the first lens and an image plane at the wide-angle end.

By satisfying the above condition (3) that specifies the relationship between the focal length of the second lens and the focal length of the lens system at the wide-angle end, aberrations, especially, spherical aberration and coma aberrations are properly corrected, the overall length of the lens system is shortened, and a zoom ratio of approximately 2.5× to 3× is ensured.

Preferably, the following conditions (4) and (5) are satisfied:

$$2.5<Dw/fw<4.0 \tag{4}$$

$$1.0<Dt/ft<2.0 \tag{5}$$

where Dw represents the distance between the front surface of the first lens and the image plane at the wide-angle end (back focus is an air-converted distance), Dt represents the distance between the front surface of the first lens and the image plane at the telephoto end (back focus is an air-converted distance), fw represents the focal length of the lens system between the first lens and the image plane at the wide-angle end, and ft represents the focal length of the lens system between the first lens and the image plane at the telephoto end.

By satisfying the above conditions (4) and (5) that specify the relationship between the overall length and the focal length of the lens system at the wide-angle end and the telephoto end, an appropriate zoom ratio of 2.5× to 3× is ensured, and the overall length of the lens system is easily shortened.

Preferably, the following conditions (6), (7), and (8) are satisfied:

$$2.0<|fG1|/|fw|<4.0 \tag{6}$$

$$0.7<|fG1|/|ft|<1.5 \tag{7}$$

$$0.5<fG2/fG3<1.2 \tag{8}$$

where fw represents the focal length of the lens system between the front surface of the first lens and the image plane at the wide-angle end, ft represents the focal length of the lens system between the front surface of the first lens and the image plane at the telephoto end, fG1 represents the focal length of the first lens unit, fG2 represents the focal length of the second lens unit, and fG3 represents the focal length of the third lens unit.

By satisfying the conditions (6), (7), and (8) relating to the powers of the lens units, aberrations, especially, distortion and astigmatism are properly corrected, the overall length of the lens system is shortened, and a zoom ratio of approximately 2.5× to 3× is easily ensured.

The first lens may be made of glass, and may be spherical on the object side and the image plane side.

In this case, the cost of the glass lens can be made lower than that of a glass lens having an aspherical surface. Consequently, the zoom lens is inexpensive, and is suitably applied to a mobile camera of a mobile telephone.

The second lens and the third lens may be made of resin and aspherical on both the object side and the image plane side, and the fourth lens may be aspherical on at least one of the object side and the image plane side.

When the second lens and the third lens are aspherical, particularly, spherical aberration and coma aberration can be properly corrected over the entire range from the wide-angle end to the telephoto end. Further, when the fourth lens is aspherical, particularly, astigmatism can be properly corrected over the entire range from the wide-angle end to the telephoto end. This allows the zoom lens to be properly corrected for aberrations and to have high optical performance.

In this case, the cost can be reduced and a complicated shape can be easily obtained, compared with a case in which the lenses are made of glass. Moreover, since the weight can be reduced, a load put on a motor for driving the lens units can be reduced. Smaller loads lead to lower power consumption.

Preferably, the Abbe number v1 of the first lens satisfies the following condition (9):

$$v1>60 \tag{9}$$

By satisfying the condition (9) that specifies the Abbe number of the first lens, chromatic aberration, especially, axial chromatic aberration over the entire range from the wide-angle end to the telephoto end can be properly corrected, and the optical performance of the zoom lens can be enhanced.

Preferably, the following condition (10) is satisfied:

$$v2-v3>20 \tag{10}$$

where v2 represents the Abbe number of the second lens, and v3 represents the Abbe number of the third lens.

By satisfying the condition (10) that specifies the relationship between the Abbe numbers of the second lens and the third lens, chromatic aberration, especially, lateral chromatic aberration over the entire range from the wide-angle end to the telephoto end can be properly corrected, and the optical performance of the zoom lens can be enhanced.

As described above, according to the present invention, the size, thickness, weight, and cost of the zoom lens can be reduced. Therefore, the zoom lens is suitable for use in a mobile camera mounted in a mobile telephone.

In particular, although the zoom lens has a three-unit four-lens structure, it can be compact and slim, has a zoom ratio of approximately 2.5× to 3×, and is properly corrected for aberrations with high optical performance because the power layout and the positions of aspherical surfaces of the lenses are appropriately determined.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 2A, 2B, and 2C are explanatory views, respectively, showing states in which the zoom lens shown in FIG. 1 is placed at the wide-angle end, the middle position, and the telephoto end;

FIGS. 7A, 7B, and 7C are explanatory views, respectively, showing states in which the zoom lens shown in FIG. 6 is placed at the wide-angle end, the middle position, and the telephoto end;

FIG. 8 includes aberration charts showing spherical aberration, astigmatism, distortion, and lateral chromatic aberration caused when a zoom lens of Example 2 is placed at the wide-angle end;

DESCRIPTION OF THE PRESENT INVENTION

Embodiments of the present invention will be described below with reference to the attached drawings.

Figure 1:
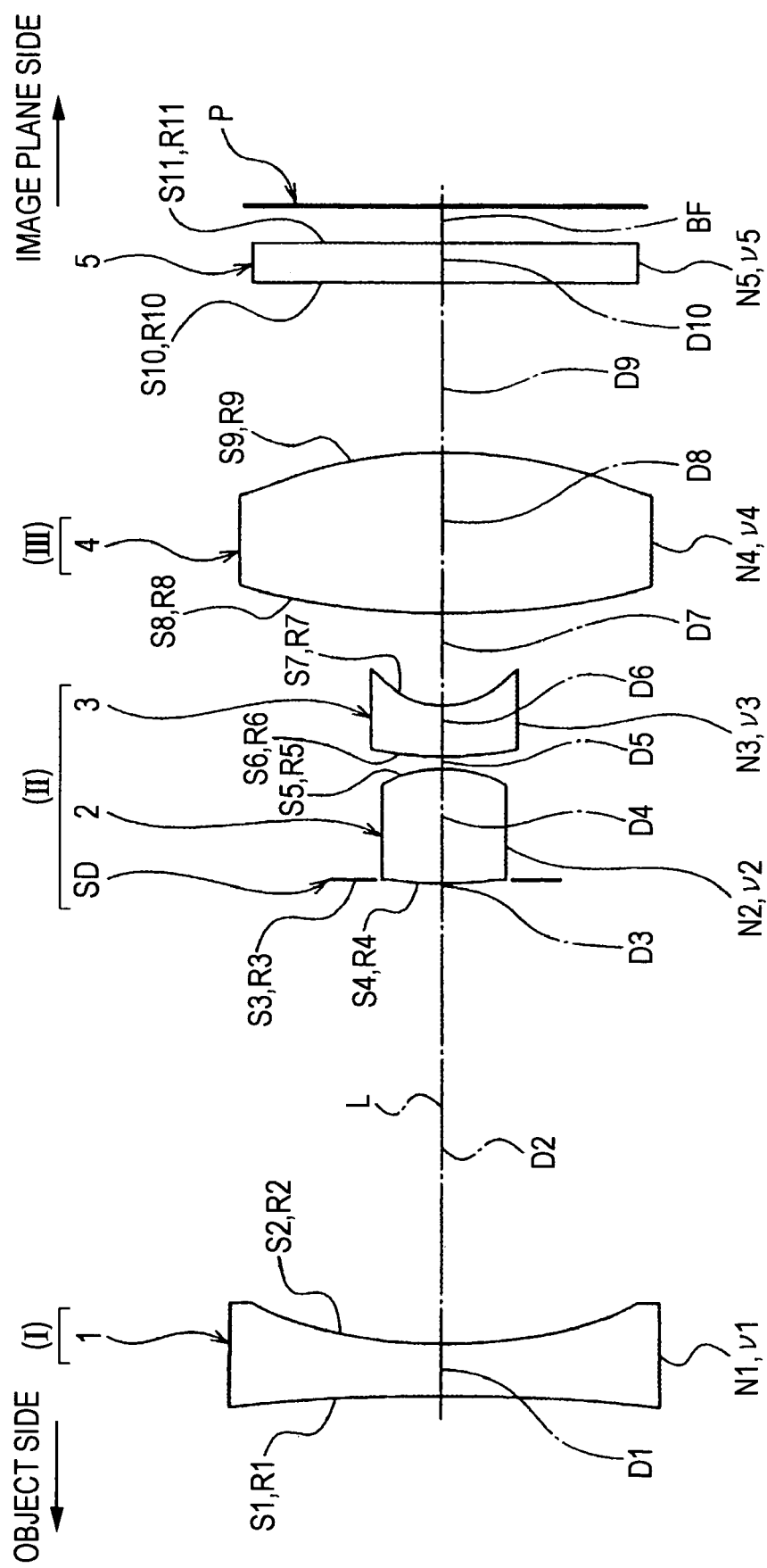
FIG. 1 is a basic structural view of a zoom lens according to an embodiment of the present invention.

FIG. 1 illustrates the basic configuration of a zoom lens according to an embodiment of the present invention, and FIGS. 2A, 2B, and 2C respectively illustrate the states in which the zoom lens is placed at the wide-angle end, the middle position, and the telephoto end.

Referring to FIG. 1, the zoom lens includes a first lens unit (I) having a negative refractive power as a whole, a second lens unit (II) having a positive refractive power as a whole, and a third lens unit (III) having a positive refractive power as a whole. The first to third lens units (I) to (III) are arranged in that order from an object side to an image plane side of the zoom lens.

During zooming from the wide-angle end to the telephoto end, the first lens unit (I) is fixed at a predetermined position, and the second lens unit (II) and the third lens unit (III) are moved, as shown in FIGS. 2A, 2B, and 2C. That is, the second lens unit (II) is moved from the image plane side to the object side, and the third lens unit (III) is moved from the object side to the image plane side.

The first lens unit (I) is formed of a first lens 1 having a negative refractive power.

The second lens unit (II) includes a second lens 2 having a positive refractive power, a third lens 3 having a negative refractive power, and an aperture stop SD, such as a lens frame, which is integrally provided adjacent to a front surface of the second lens 2 (a position slightly offset backward from the front surface) to define a predetermined aperture. The second lens 2, the third lens 3, and the aperture stop SD are arranged in that order from the object side to the image plane side.

The third lens unit (III) is formed of a fourth lens 4 having a positive refractive power.

The zoom lens has a three-unit, four-lens structure. One lens unit (I) is fixed at a predetermined position and two lens units (II) and (III) are independently movable along the optical axis defined by the four lenses.

In the above configuration, a glass filter 5, such as an infrared cut filter or a low-pass filter, is disposed on the image plane side of the four lens 4 of the third lens unit (III), and an image plane P of a CCD serving as a solid-state image sensor is disposed behind the glass filter 5.

Herein, the focal length of the lens system (from a front surface of the first lens unit (I) to the image plane P) is represented by f, the focal length of the first lens unit (I) is represented by fG1, the focal length of the second lens unit (II) is represented by fG2, the focal length of the third lens unit (III) is represented by fG3, the focal length of the lens system at the wide-angle end is represented by fw, the focal length of the lens system at the telephoto end is represented by ft, the focal length of the lens system at the middle position is represented by fm, and the focal length of the second lens 2 is represented by fg2.

The surfaces of the first lens 1, the aperture stop SD, the second to fourth lenses 2 to 4, and the glass filter 5 are represented by Si (i=1 to 11), the radii of curvature of the surfaces Si are represented by Ri (i=1 to 11), the refractive indices of the surfaces Si with respect to line d are represented by Ni (i=1 to 5), and the Abbe numbers of the surfaces Si are represented by vi (i=1 to 5).

The distances (thicknesses, air spaces) among the elements from the first lens 1 to the glass filter 5 along the optical axis L are represented by Di (i=1 to 10), the distance of the lens system at the wide-angle end (back focus is an air converted distance) is represented by Dw, the distance of the lens system at the telephoto end (back focus is an air converted distance) is represented by Dt, the distance between the first lens unit (I) and the second lens unit (II) at the wide-angle end is represented by Dw1-2 (=D2 or D2+D3), the distance between the second lens unit (II) and the third lens unit (III) at the wide-angle end is represented by Dw2-3 (=D7), the distance between the first lens unit (I) and the second lens unit (II) at the telephoto end is represented by Dt1-2 (D2 or D2+D3), the distance between the second lens unit (II) and the third lens unit (III) at the telephoto end is represented by Dt2-3 (=D7), the distance between a rear surface S9 of the fourth lens 4 and the image plane P (air converted distance) serves as the back focus, and the distance between a rear surface S11 of the glass filter 5 and the image plane P is represented by BF.

The first lens 1 is a biconcave lens made of glass and having a negative refractive power. The first lens 1 has a concave surface S1 facing toward the object side, and a concave surface S2 facing toward the image plane side.

The second lens 2 is a biconvex lens made, in one embodiment, of a resin material (plastic material) and having a positive refractive power. The second lens 2 has a convex surface S4 facing toward the object side, and a convex surface S5 facing toward the image plane side.

The third lens 3 is a meniscus lens made, in one embodiment, of a resin material (plastic material) and having a negative refractive power. The third lens 3 has a convex surface S6 facing toward the object side, and a concave surface S7 facing toward the image plane side.

The fourth lens 4 is a biconvex lens made, in one embodiment, of glass and having a positive refractive power. The fourth lens 4 has a convex surface S8 facing toward the object side, and a convex surface S9 facing toward the image plane side.

Since the second lens 2 and the third lens 3 can be made of a resin material (plastic material), the weight and cost of the lens system can be made lower than when the lenses are made of glass. Moreover, the lenses can be easily formed in a complicated shape. Reduction in weight reduces the load put on a motor for driving the second lens unit (II), and thereby lowers power consumption.

The surfaces S1 and S2 on the object side and the image plane side of the first lens 1 are spherical. That is, since the first lens 1 is a spherical lens made of glass, the cost can be reduced. This allows an inexpensive zoom lens suitable for use in a mobile camera that is applied to a mobile telephone.

Both the surfaces S4 and S5 of the second lens 2, both the surfaces S6 and S7 of the third lens 3, and at least one of the surfaces S8 and S9 of the fourth lens 4 may be aspherical.

When the surfaces S4 and S5 of the second lens 2 are aspherical, especially, spherical aberration and coma aberration can be properly corrected over the entire range from the wide-angle end to the telephoto end. When the surface S8 or S9 of the fourth lens 4 is aspherical, especially, astigmatism can be properly corrected over the entire range from the wide-angle end to the telephoto end. Therefore, the zoom lens is properly corrected for aberrations as a whole, and the optical performance thereof is enhanced.

The aspherical surfaces are defined by the following expression:

$$Z = Cy^2/[1+(1-\epsilon C^2 y^2)1/2] + Dy^4 + Ey^6 + Fy^8 + Gy^{10} + Hy^{12}$$

where Z represents the distance from the tangent plane to the apex of the aspherical surface to a point on the aspherical surface at a height y from the optical axis L, y represents the height from the optical axis L, C represents the curvature (1/R) at the apex of the aspherical surface, $\epsilon$ represents the conic constant, and D, E, F, and G represent the aspherical coefficients.

In the above configuration, it is preferable to satisfy the following conditions (1) and (2):

$$4.5 < Dw1\text{-}2/Dw2\text{-}3 < 8.5 \tag{1}$$

$$Dt1\text{-}2/Dt2\text{-}3 < 0.2 \tag{2}$$

where Dw1-2 represents the distance between the first lens unit (I) and the second lens unit (II) at the wide-angle end, Dw2-3 represents the distance between the second lens unit (II) and the third lens unit (III) at the wide-angle end, Dt1-2 represents the distance between the first lens unit (I) and the second lens unit (II) at the telephoto end, and Dt2-3 represents the distance between the second lens unit (II) and the third lens unit (III) at the telephoto end.

The conditions (1) and (2) specify the distances among the first lens unit (I), the second lens unit (II), and the third lens unit (III) along the optical axis at the wide-angle end and the telephoto end. That is, when Dw1-2/Dw2-3 is smaller than or equal to 4.5 and Dt1-2/Dt2-3 is larger than or equal to 0.2, it is difficult to ensure a sufficient space in which the lenses are moved. If the powers of the lenses are increased, it is difficult to correct aberrations. In contrast, when Dw1-2/Dw2-3 is larger than or equal to 8.5, the space in which the lenses are moved becomes too wide, and it is difficult to shorten the overall length of the lens system. Therefore, the overall length of the lens system can be shortened and aberrations can be properly corrected while ensuring a sufficient moving range of the lenses by satisfying the conditions (1) and (2).

Preferably, the following condition (3) is satisfied:

$$fg2/fw < 1.5 \tag{3}$$

where fg2 represents the focal length of the second lens 2, and fw represents the focal length of the lens system between the front surface S1 of the first lens 1 and the image plane P at the wide-angle end.

The condition (3) specifies the relationship between the focal length of the second lens 2 and the focal length of the lens system at the wide-angle end. In a case in which fg2/fw is larger than or equal to 1.5, in order to ensure a zoom ratio of approximately 2.5× to 3× with a reduced overall length of the lens system, the power of the second lens 2 is too small, and needs to be complemented by increasing the power of the third lens 3. Therefore, it is difficult to correct aberrations, especially, spherical aberration and coma aberration. In contrast, when priority is given to correction of aberrations, the power of the second lens unit (II) is too small, and it is difficult to ensure a zoom ratio of approximately 2.5× to 3× while shortening the overall length of the lens system. By satisfying the condition (3), it is possible to properly correct aberrations, especially, spherical aberration and coma aberration, to shorten the overall length of the lens system, and to ensure a zoom ratio of approximately 2.5× to 3×.

Preferably, the following conditions (4) and (5) are satisfied:

$$2.5 < Dw/fw < 4.0 \tag{4}$$

$$1.0 < Dt/ft < 2.0 \tag{5}$$

where Dw represents the distance between the front surface S1 of the first lens 1 and the image plane P at the wide-angle end (back focus is an air converted distance), Dt represents the distance between the front surface S1 of the first lens 1 and the image plane P at the telephoto end (back focus is an air converted distance), fw represents the focal length of the lens system between the first lens 1 and the image plane P at the wide-angle end, and ft represents the focal length of the lens system between the first lens 1 and the image plane P at the telephoto end.

The conditions (4) and (5) specify the relationship between the overall lengths and focal lengths of the lens system at the wide-angle end and the telephoto end. When Dw/fw and Dt/ft do not satisfy the conditions (4) and (5), it is difficult to shorten the overall length of the lens system while ensuring an appropriate zoom ratio. By satisfying the conditions (4) and (5), the overall length of the lens system can be easily shortened while ensuring an appropriate zoom ratio of approximately 2.5× to 3×.

Preferably, the following conditions (6), (7), and (8) are satisfied:

$$2.0 < |fG1|/|fw| < 4.0 \quad (6)$$

$$0.7 < |fG1|/|ft| < 1.5 \quad (7)$$

$$0.5 < fG2/fG3 < 1.2 \quad (8)$$

where fw represents the focal length of the lens system between the front surface S1 of the first lens 1 and the image plane P at the wide-angle end, ft represents the focal length of the lens system between the front surface S1 and the image plane P at the telephoto end, fG1 represents the focal length of the first lens unit (I), fG2 represents the focal length of the second lens unit (II), and fG3 represents the focal length of the third lens unit (III).

The conditions (6), (7), and (8) specify the powers of the first to third lens units (I) to (III). When |fG1|/|fw| is larger than or equal to 4 and |fG1|/|ft| is larger than or equal to 1.5, the power of the first lens unit (I) is too small, and it is difficult to ensure a zoom ratio of approximately 2.5× to 3× while shortening the overall length of the lens system. In contrast, when |fG1|/|fw| is smaller than or equal to 2 and |fG1|/|ft| is smaller than or equal to 0.7, the power of the first lens unit (I) is too large, and it is difficult to correct aberrations, especially, distortion between the wide-angle end and the telephoto end.

When fG2/fG3 is larger than or equal to 1.2, the power of the third lens unit (III) is excessively large compared with the second lens unit (II), and it is difficult to correct aberrations, especially, astigmatism between the wide-angle end and the telephoto end. In contrast, when fG2/fG3 is smaller than or equal to 0.5, the power of the third lens unit (III) is excessively small compared with the second lens unit (II), and it is difficult to ensure a zoom ratio of approximately 2.5× to 3× while shortening the overall length of the lens system.

By satisfying the conditions (6), (7), and (8), aberrations, especially, distortion and astigmatism can be properly corrected, and a zoom ratio of approximately 2.5× to 3× can be easily ensured with a reduced overall length of the lens system.

Preferably, the Abbe number ν1 of the first lens 1 satisfies the following condition (9):

$$\nu 1 > 60 \quad (9)$$

The condition (9) specifies the Abbe number of the first lens 1. By satisfying the condition (9), chromatic aberration, especially, axial chromatic aberration over the entire range from the wide-angle end to the telephoto end can be properly corrected, and the optical performance of the zoom lens can be enhanced.

Preferably, the following condition (10) is satisfied:

$$\nu 2 - \nu 3 > 20 \quad (10)$$

where ν2 represents the Abbe number of the second lens 2, and ν3 represents the Abbe number of the third lens 3.

The condition (10) specifies the relationship between the Abbe numbers of the second lens 2 and the third lens 3. By satisfying the condition (10), chromatic aberration, especially, lateral chromatic aberration over the entire range from the wide-angle end to the telephoto end can be properly corrected, and the optical performance of the zoom lens can be enhanced.

EXAMPLE 1

A description will be given below of Example 1 obtained by applying specific numerical values to the zoom lens having the above-described configuration according to an embodiment. Table 1 shows main specifications of Example 1, Table 2 shows various numerical data (setting values), Table 3 shows numerical data on the aspherical surfaces, and Table 4 shows numerical data on the focal lengths of the lens system at the wide-angle end, the middle position, and the telephoto end (wide-angle end fw, middle position fm, telephoto end ft), and the variable distances D2 (Dw1-2, Dm1-2, Dt1-2), D7 (Dw2-3, Dm2-3, Dt2-3), and D9 (Dw3-4, Dm3-4, Dt3-4) on the optical axis L (distances at the wide-angle end, the middle position, and the telephoto end).

Numerical data relating to the above conditions (1) to (10) are as follows:

$$Dw1\text{-}2/fw2\text{-}3 = 6.291/1.230 = 5.11 \quad (1)$$

$$Dt1\text{-}2/Dt2\text{-}3 = 0.937/8.340 = 0.11 \quad (2)$$

$$fg2/fw = 2.98/4.84 = 0.62 \quad (3)$$

$$Dw/fw = 15.83/4.84 = 3.27 \quad (4)$$

$$Dt/ft = 15.83/11.9 = 1.53 \quad (5)$$

$$|fG1|/|fw| = 14.07/4.48 = 2.91 \quad (6)$$

$$|fG1|/|ft| = 14.07/11.9 = 1.18 \quad (7)$$

$$fG2/fG3 = 6.83/8.87 = 0.78 \quad (8)$$

$$\nu 1 = 81.5 \quad (9)$$

$$\nu 2 - \nu 3 = 56.3 - 30.3 = 26.0 \quad (10)$$

Figure 3:
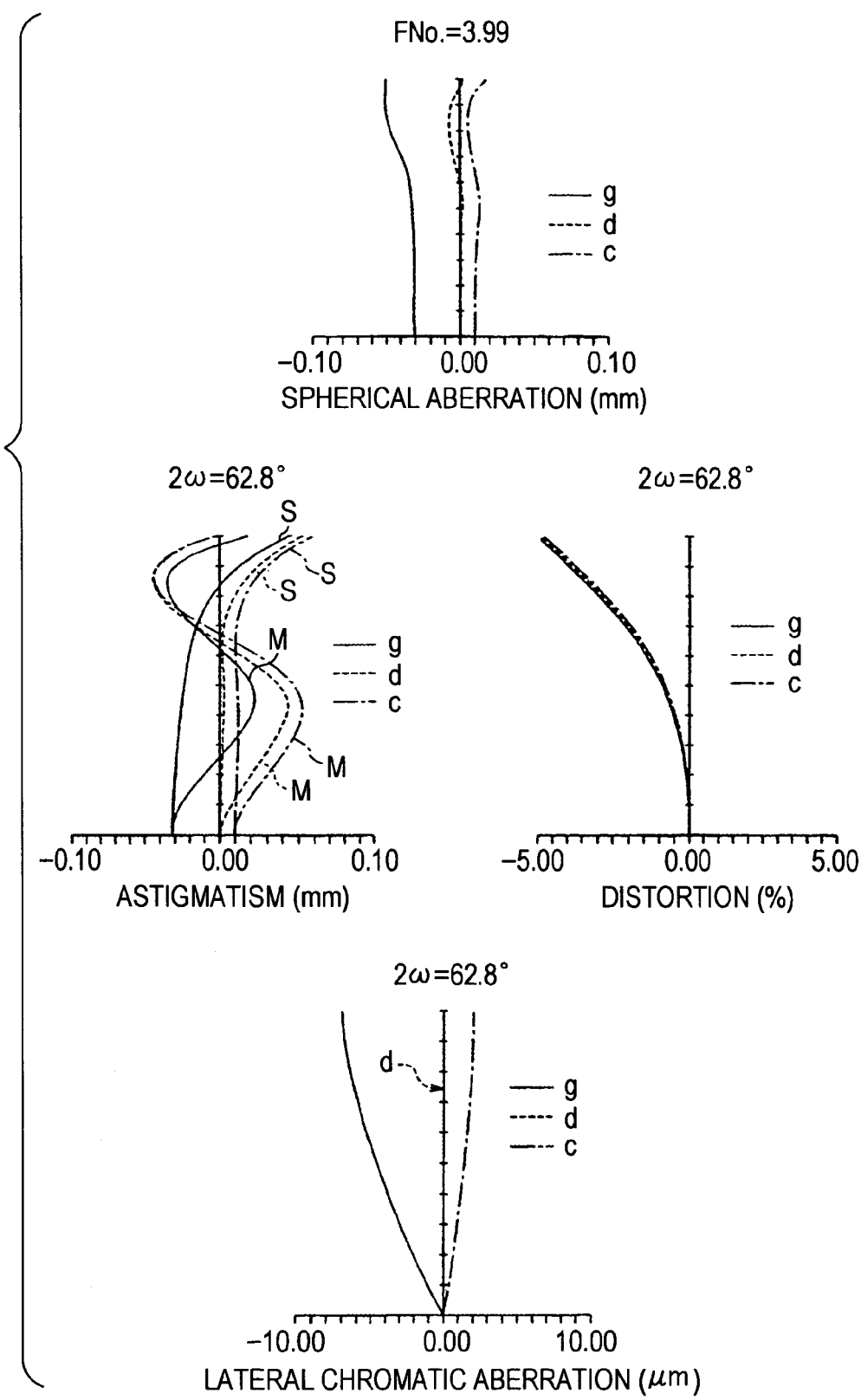
FIG. 3 includes aberration charts showing spherical aberration, astigmatism, distortion, and lateral chromatic aberration caused when a zoom lens of Example 1 is placed at the wide-angle end.
Figure 4:
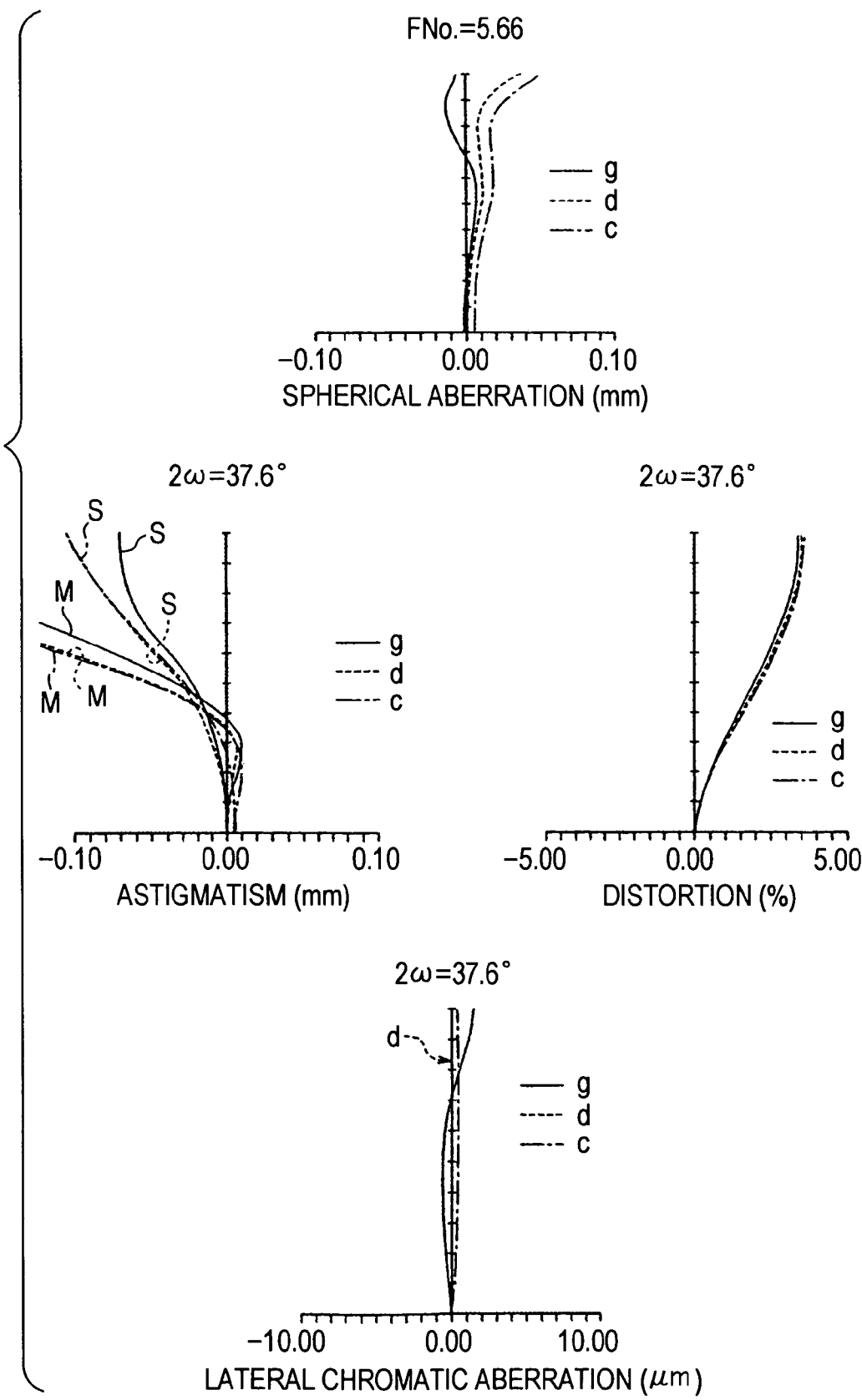
FIG. 4 includes aberration charts showing spherical aberration, astigmatism, distortion, and lateral chromatic aberration caused when the zoom lens of Example 1 is placed at the middle position.
Figure 5:
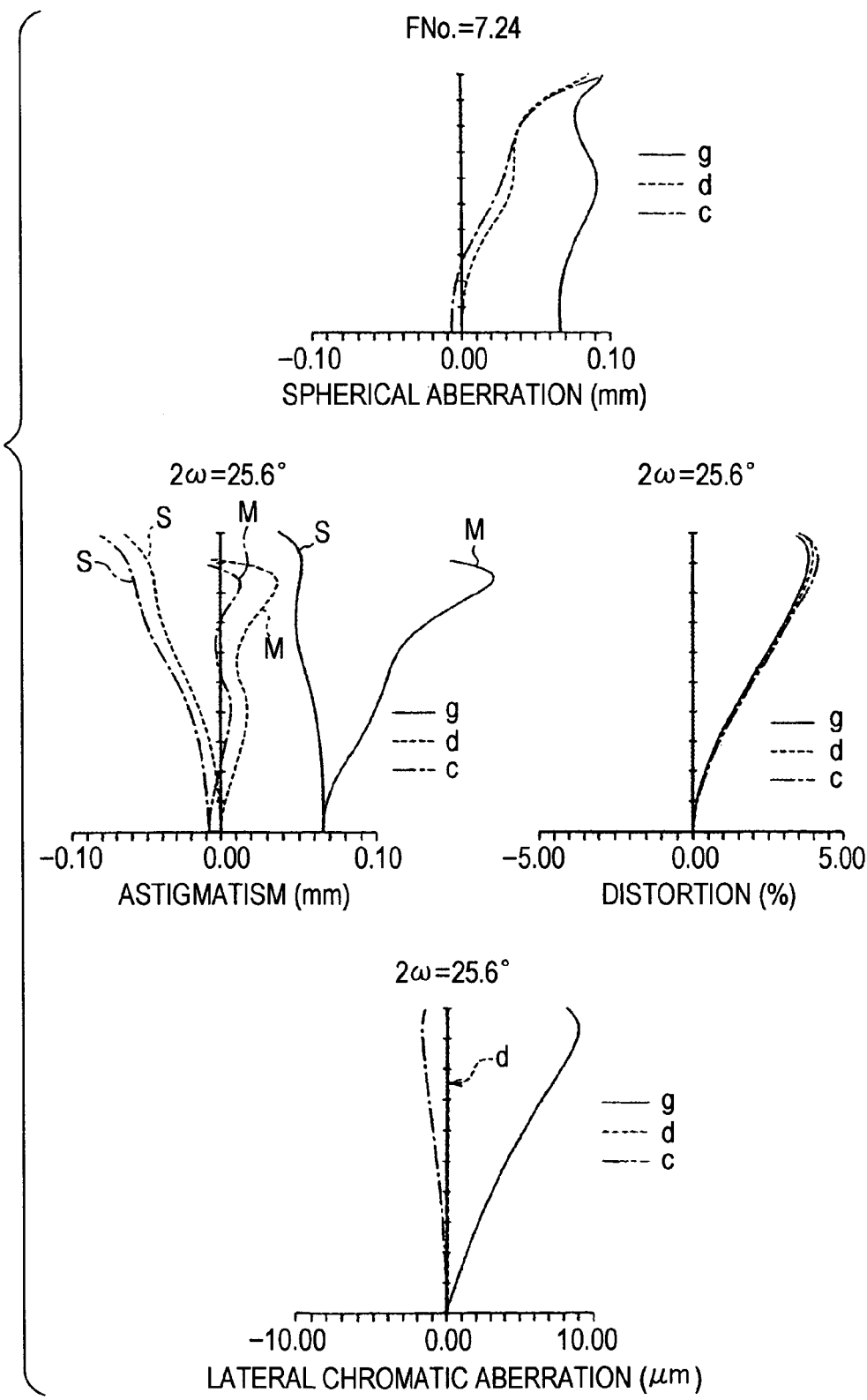
FIG. 5 includes aberration charts showing spherical aberration, astigmatism, distortion, and lateral chromatic aberration caused when the zoom lens of Example 1 is placed at the telephoto end.

FIGS. 3, 4, and 5 are aberration charts indicating spherical aberration, astigmatism, distortion, and lateral chromatic aberration at the wide-angle end, the middle position, and the telephoto end. In FIGS. 3, 4, and 5, g represents the aberration of g line, d represents the aberration of d line, c represents the aberration of c line, S represents the aberration at the sagittal plane, and M represents the aberration at the meridional plane.

TABLE 1

| | Wide-Angle End (W) | Middle Position (M) | Telephoto End (T) |
|---|---|---|---|
| Object Distance (mm) | | Infinite (∞) | |
| Focal Length of Lens System (mm) | fw 4.84 | fm 8.00 | ft 11.90 |
| Zoom ratio | | 2.46 | |
| F-number | 3.99 | 5.66 | 7.24 |
| Position of Exit Pupil (mm) | −8.82 | −51.79 | 59.19 |
| Angle of View (2ω)(°) | 62.8 | 37.6 | 25.6 |
| Overall Length of Lens System (mm) (Distance between Front Surface of First Lens and Rear Surface of Fourth Lens) | 12.74 | 14.086 | 14.50 |
| Overall Length of Lens System (mm) (Distance between Front Surface of First Lens and Image Plane) Air Converted Distance | | 15.83 | |
| Back Focus (mm) | 3.07 | 1.74 | 1.33 |

TABLE 1-continued

|  | Wide-Angle End (W) | Middle Position (M) | Telephoto End (T) |
|---|---|---|---|
| (Distance between Rear Surface of Fourth Lens and Image Plane) Air Converted Distance |  |  |  |
| Focal Length of First Lens Unit (fG1) |  | −14.07 |  |
| Focal Length of Second Lens Unit (fG2) |  | 6.83 |  |
| Focal Length of Third Lens Unit (fG3) |  | 8.87 |  |
| Focal Length of Second Lens (fg2) |  | 2.98 |  |

TABLE 2

| Surface | Radius of Curvature (mm) | | Distance on Optical Axis (mm) | Refractive Index (d line) | Abbe Number |
|---|---|---|---|---|---|
| S1 | R1 | −40.416 | D1 0.650 | N1 1.49700 | ν1 81.5 |
| S2 | R2 | 8.500 | D2 Variable |  |  |
| S3 | R3 | ∞ (Aperture Stop) | D3 −0.068 |  |  |
| S4* | R4 | 4.915 | D4 1.600 | N2 1.52512 | ν2 56.3 |
| S5* | R5 | −2.040 | D5 0.150 |  |  |
| S6* | R6 | 3.846 | D6 0.700 | N3 1.58385 | ν3 30.3 |
| S7* | R7 | 1.169 | D7 Variable |  |  |
| S8 | R8 | 12.674 | D8 2.190 | N4 1.51835 | ν4 70.3 |
| S9* | R9 | −6.801 | D9 Variable |  |  |
| S10 | R10 | ∞ | D10 0.500 | N5 1.51680 | ν5 64.2 |
| S11 | R11 | ∞ | BF 0.500 |  |  |

*Aspherical surface

TABLE 3

| Aspherical Coefficient | | Numerical Data |
|---|---|---|
| S4 | ε | −0.63348300 |
|  | D | −0.11783100 × $10^{-1}$ |
|  | E | −0.84339600 × $10^{-2}$ |
|  | F | 0.37303700 × $10^{-2}$ |
|  | G | −0.34444900 × $10^{-2}$ |
|  | H | 0.00000000 |
| S5 | ε | −3.39854600 |
|  | D | −0.23200300 × $10^{-1}$ |
|  | E | −0.13047200 × $10^{-1}$ |
|  | F | 0.14855500 × $10^{-1}$ |
|  | G | −0.73482300 × $10^{-2}$ |
|  | H | 0.00000000 |
| S6 | ε | 1.00000000 |
|  | D | −0.65187800 × $10^{-1}$ |
|  | E | 0.85640100 × $10^{-2}$ |
|  | F | 0.15895700 × $10^{-1}$ |
|  | G | −0.10405500 × $10^{-1}$ |
|  | H | 0.00000000 |
| S7 | ε | 0.56252400 |
|  | D | −0.18737400 |
|  | E | 0.73714400 × $10^{-1}$ |
|  | F | −0.33703900 × $10^{-1}$ |
|  | G | 0.32654500 × $10^{-2}$ |
|  | H | 0.00000000 |

TABLE 3-continued

| Aspherical Coefficient | | Numerical Data |
|---|---|---|
| S9 | ε | 1.00000000 |
|  | D | 0.58043300 × $10^{-2}$ |
|  | E | −0.84033200 × $10^{-3}$ |
|  | F | 0.81089700 × $10^{-4}$ |
|  | G | −0.31903500 × $10^{-5}$ |
|  | H | 0.00000000 |

TABLE 4

|  | Wide-Angle End (W) | Middle Position (M) | Telephoto End (T) |
|---|---|---|---|
| Focal Length of Lens System (mm) | (fw) 4.84 | (fm) 8.00 | (ft) 11.90 |
| D2 (mm) | ($Dw_{1-2}$) 6.291 | ($Dm_{1-2}$) 3.387 | ($Dt_{1-2}$) 0.937 |
| D7 (mm) | ($Dw_{2-3}$) 1.230 | ($Dm_{2-3}$) 5.477 | ($Dt_{2-3}$) 8.340 |
| D9 (mm) | 2.256 | 0.914 | 0.500 |

In the above Example 1, the overall length of the lens system (air-converted distance between the front surface S1 of the first lens 1 and the image plane P) is 15.83 mm (fixed), the zoom ratio is 2.46 (fixed), the f-number is 3.99, 5.66, and 7.24, and the angle of view (2ω) is 62.8°, 37.6°, and 25.6°, respectively, at the wide-angle end, the middle position, and the telephoto end. In this way, it is possible to obtain a compact and slim zoom lens that is properly corrected for aberrations and that has high optical performance.

Figure 6:
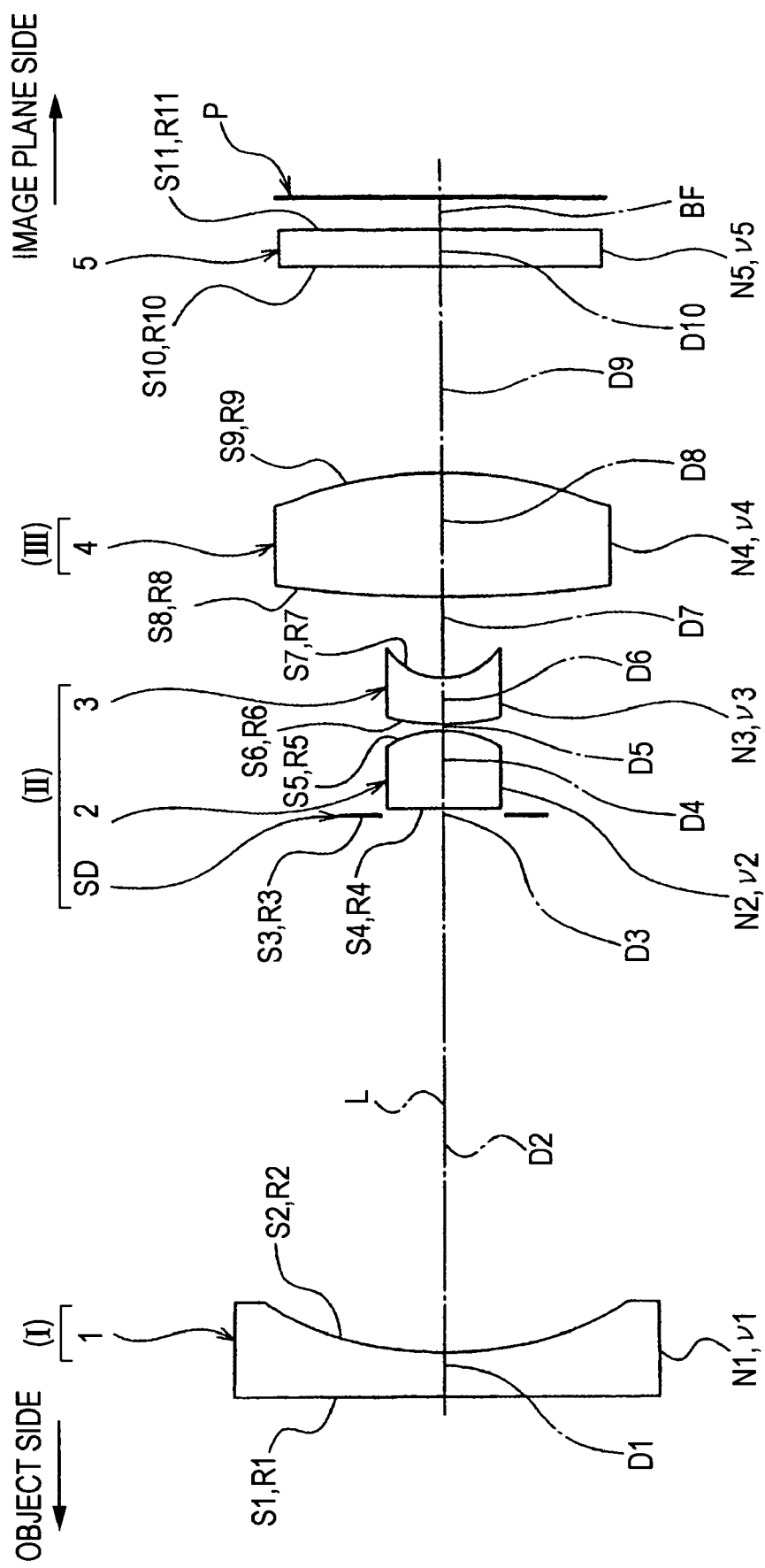
FIG. 6 is a basic structural view of a zoom lens according to another embodiment of the present invention.

FIG. 6 shows the basic configuration of a zoom lens according to another embodiment of the present invention, and FIGS. 7A, 7B, and 7C respectively show the states in which the zoom lens shown in FIG. 6 is placed at the wide-angle end, the middle position, and the telephoto end.

The embodiment is the same as the above-described embodiment except that various numerical data are changed. A description will be given below of Example 2 obtained by applying specific numerical values to the zoom lens of this embodiment.

EXAMPLE 2

Table 5 shows main specifications of Example 2, Table 6 shows various numerical data (setting values), Table 7 shows numerical data on the aspherical surfaces, and Table 8 shows numerical data on the focal lengths of the lens system at the wide-angle end, the middle position, and the telephoto end (wide-angle end fw, middle position fm, telephoto end ft), and the variable distances D2+D3 (Dw1-2, Dm1-2, Dt1-2), D7 (Dw2-3, Dm2-3, Dt2-3), and D9 (Dw3-4, Dm3-4, Dt3-4) on the optical axis L (distances at the wide-angle end, the middle position, and the telephoto end).

Numerical data relating to the above conditions (1) to (10) are as follows:

$$Dw1\text{-}2/fw2\text{-}3 = 8.102/1.155 = 7.01 \tag{1}$$

$$Dt1\text{-}2/Dt2\text{-}3 = 0.87/10.720 = 0.08 \tag{2}$$

$$fg2/fw = 3.21/4.78 = 0.67 \tag{3}$$

$$Dw/fw = 17.91/4.78 = 3.74 \tag{4}$$

$$Dt/ft = 17.91/14.02 = 1.28 \tag{5}$$

$|fG1|/fw|=15.08/4.77=3.16$ (6)

$|fG1|/ft|=15.08/14.02=1.08$ (7)

$fG2/fG3=7.62/10.02=0.76$ (8)

$v1=81.5$ (9)

$v2-v3=56.3-30.3=26.0$ (10)

Figure 9:
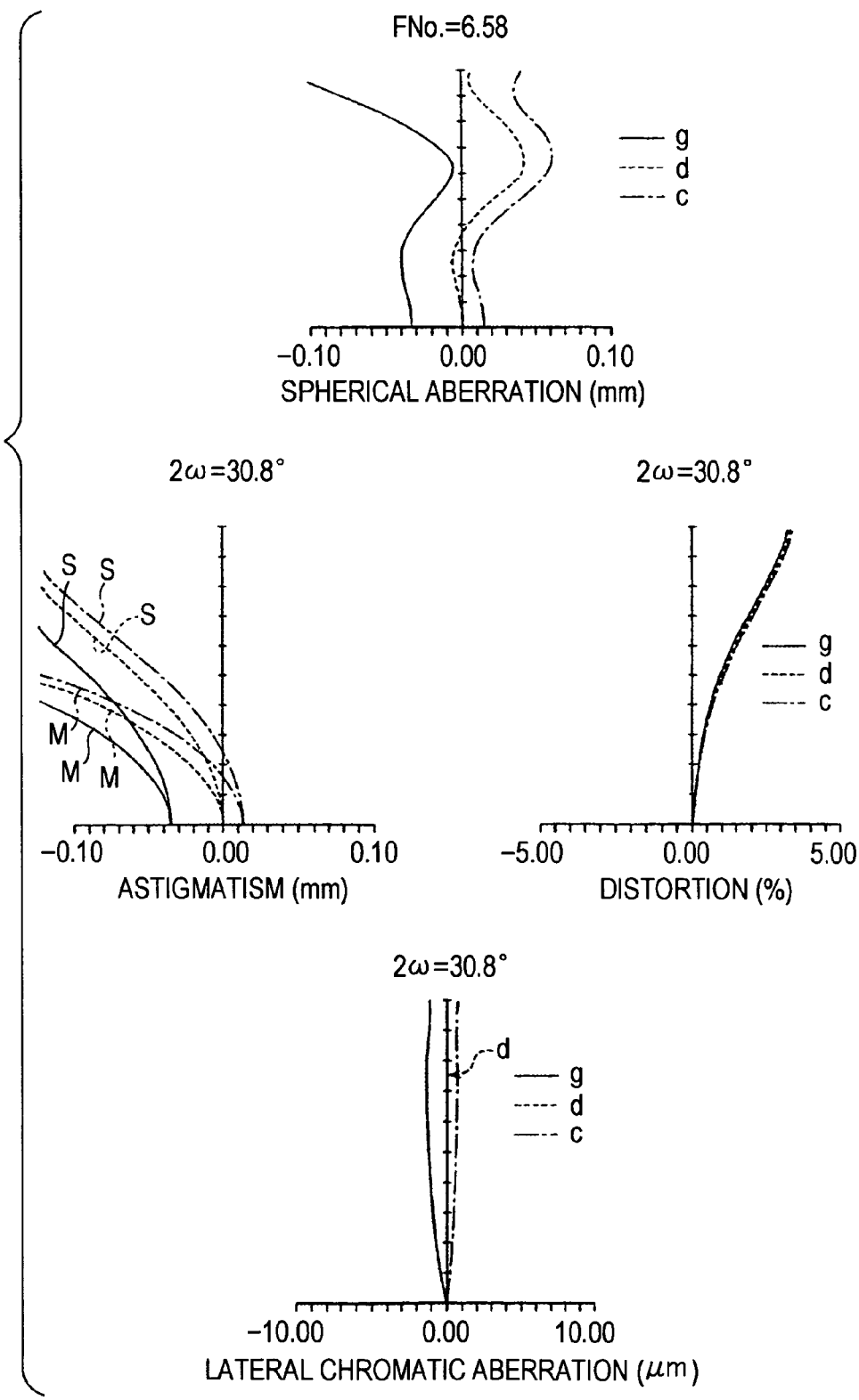
FIG. 9 includes aberration charts showing spherical aberration, astigmatism, distortion, and lateral chromatic aberration caused when the zoom lens of Example 2 is placed at the middle position.
Figure 10:
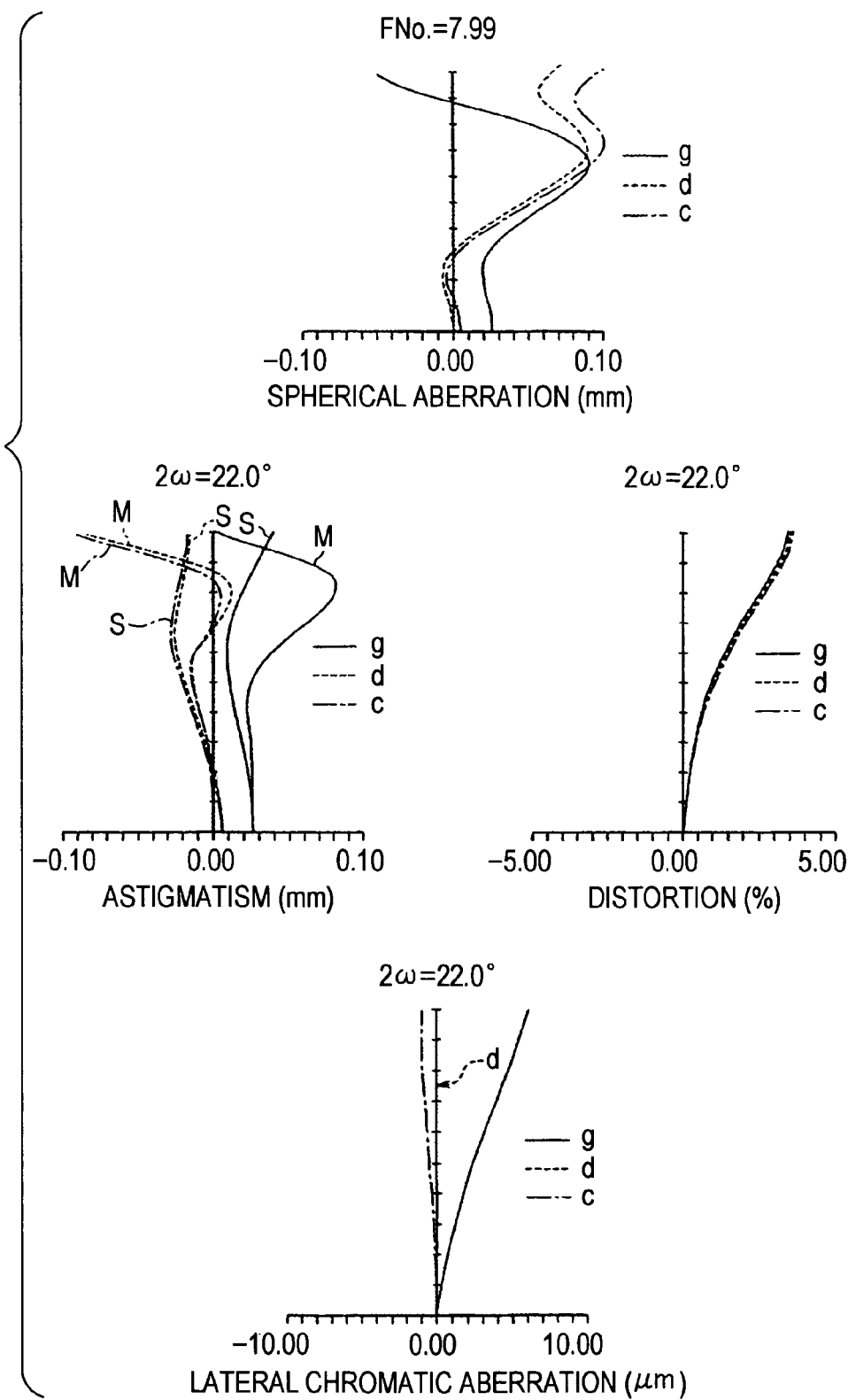
FIG. 10 includes aberration charts showing spherical aberration, astigmatism, distortion, and lateral chromatic aberration caused when the zoom lens of Example 2 is placed at the telephoto end.

FIGS. 8, 9, and 10 are aberration charts indicating spherical aberration, astigmatism, distortion, and lateral chromatic aberration at the wide-angle end, the middle position, and the telephoto end. In FIGS. 8, 9, and 10, g represents the aberration of g line, d represents the aberration of d line, c represents the aberration of c line, S represents the aberration at the sagittal plane, and M represents the aberration at the meridional plane.

TABLE 5

|  | Wide-Angle End (W) | Middle Position (M) | Telephoto End (T) |
|---|---|---|---|
| Object Distance (mm) |  | Infinite (∞) |  |
| Focal Length of Lens System (mm) | fw 4.78 | fm 9.94 | ft 14.03 |
| Zoom ratio |  | 2.93 |  |
| F-number | 3.96 | 6.58 | 7.99 |
| Position of Exit Pupil (mm) | −8.86 | 1208.67 | 45.03 |
| Angle of View (2ω)(°) | 64.5 | 30.8 | 22.0 |
| Overall Length of Lens System (mm) (Distance between Front Surface of First Lens and Rear Surface of Fourth Lens) | 14.00 | 16.29 | 16.33 |
| Overall Length of Lens System (mm) (Distance between Front Surface of First Lens and Image Plane) Air-Converted Distance |  | 17.91 |  |
| Back Focus (mm) (Distance between Rear Surface of Fourth Lens and Image Plane) Air-Converted Distance | 3.91 | 1.62 | 1.58 |
| Focal Length of First Lens Unit (fG1) |  | 15.08 |  |
| Focal Length of Second Lens Unit (fG2) |  | 7.62 |  |
| Focal Length of Third Lens Unit (fG3) |  | 10.02 |  |
| Focal Length of Second Lens (fg2) |  | 2.98 |  |

TABLE 6

| Surface | Radius of Curvature (mm) | Distance on Optical Axis (mm) | Refractive Index (d line) | Abbe Number |
|---|---|---|---|---|
| S1 | R1 −111.496 | D1 0.650 | N1 1.49700 | v1 81.5 |
| S2 | R2 8.050 | D2 Variable |  |  |
| S3 | R3 ∞ (Aperture Stop) | D3 0.050 |  |  |
| S4* | R4 10.209 | D4 1.250 | N2 1.52512 | v2 56.3 |
| S5* | R5 −1.933 | D5 0.100 |  |  |
| S6* | R6 2.882 | D6 0.740 | N3 1.58385 | v3 30.3 |
| S7* | R7 1.099 | D7 Variable |  |  |
| S8 | R8 23.357 | D8 1.950 | N4 1.51835 | v4 70.3 |
| S9* | R9 −6.490 | D9 Variable |  |  |
| S10 | R10 ∞ | D10 0.500 | N5 1.51680 | v5 64.2 |
| S11 | R11 ∞ | BF 0.500 |  |  |

*Aspherical surface

TABLE 7

| Aspherical Coefficient |  | Numerical Data |
|---|---|---|
| S4 | ε | 1.00000000 |
|  | D | −0.20506108 × $10^{-1}$ |
|  | E | −0.14500984 × $10^{-1}$ |
|  | F | 0.48250196 × $10^{-2}$ |
|  | G | −0.37364492 × $10^{-2}$ |
|  | H | 0.00000000 |
| S5 | ε | −3.29385000 |
|  | D | −0.26555252 × $10^{-1}$ |
|  | E | −0.16575923 × $10^{-1}$ |
|  | F | 0.99630224 × $10^{-2}$ |
|  | G | −0.33673271 × $10^{-2}$ |
|  | H | 0.00000000 |
| S6 | ε | 2.90116100 |
|  | D | −0.57340271 × $10^{-1}$ |
|  | E | −0.21099651 × $10^{-2}$ |
|  | F | 0.99035201 × $10^{-2}$ |
|  | G | −0.45924417 × $10^{-2}$ |
|  | H | 0.00000000 |
| S7 | ε | 0.00000000 |
|  | D | −0.14050600 |
|  | E | 0.82639556 × $10^{-1}$ |
|  | F | −0.38236482 × $10^{-1}$ |
|  | G | 0.88991997 × $10^{-2}$ |
|  | H | 0.00000000 |
| S9 | ε | 1.00000000 |
|  | D | 0.30243198 × $10^{-2}$ |
|  | E | −0.29982500 × $10^{-3}$ |
|  | F | 0.49506200 × $10^{-4}$ |
|  | G | −0.41889900 × $10^{-5}$ |
|  | H | 0.12618100 × $10^{-6}$ |

TABLE 8

|  | Wide-Angle End (W) | Middle Position (M) | Telephoto End (T) |
|---|---|---|---|
| Focal Length of Lens System (mm) | (fw) 4.78 | (fm) 9.94 | (ft) 14.03 |
| D2 + D3 (mm) | ($Dw_{1-2}$) 8.102 | ($Dm_{1-2}$) 3.470 | ($Dt_{1-2}$) 0.870 |
| D7 (mm) | ($Dw_{2-3}$) 1.155 | ($Dm_{2-3}$) 8.080 | ($Dt_{2-3}$) 10.720 |
| D9 (mm) | 3.082 | 0.789 | 0.749 |

In the above Example 2, the overall length of the lens system (air-converted distance between the front surface S1 of the first lens 1 and the image plane P) is 17.91 mm (fixed), the zoom ratio is 2.93 (fixed), the f-number is 3.96, 6.58, and 7.99, and the angle of view (2ω) is 64.5°, 30.8°, and 22.0°, respectively, at the wide-angle end, the middle position, and the telephoto end. In this way, it is possible to obtain a compact and slim zoom lens that is properly corrected for aberrations and that has high optical performance.

Figure 11:
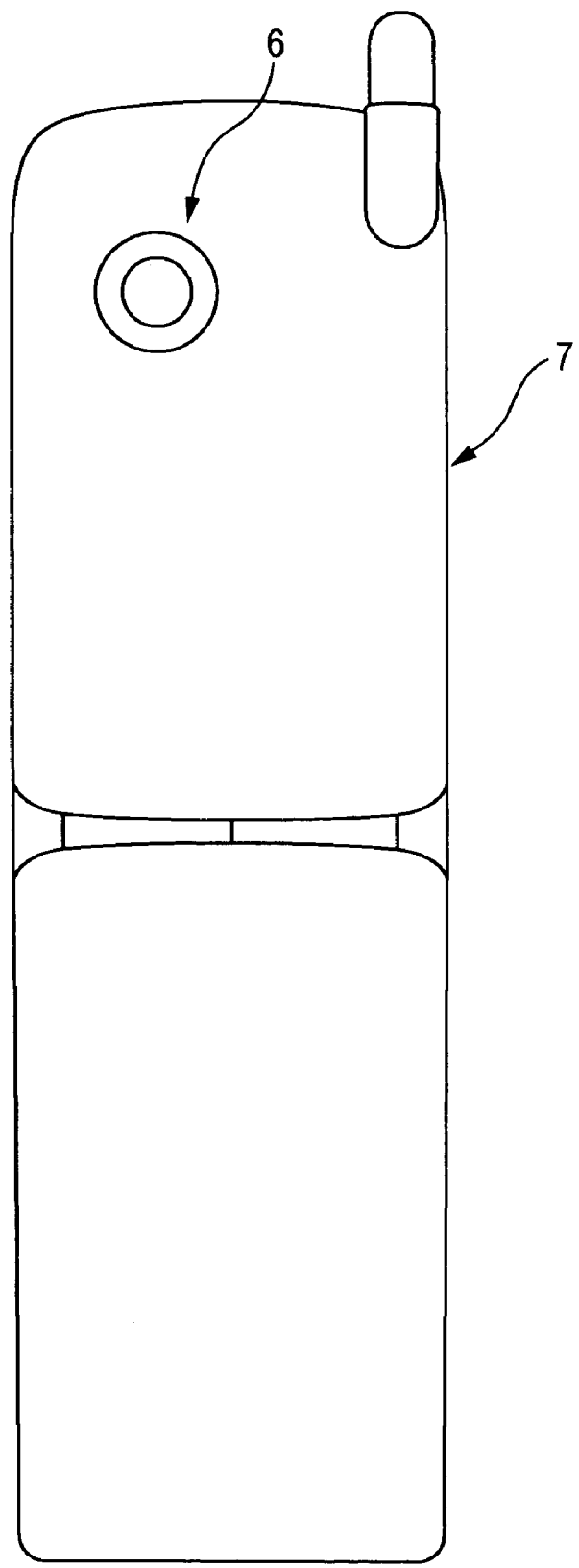
FIG. 11 is a front view of a mobile telephone in which the zoom lens of the present invention is mounted.
Figure 12:
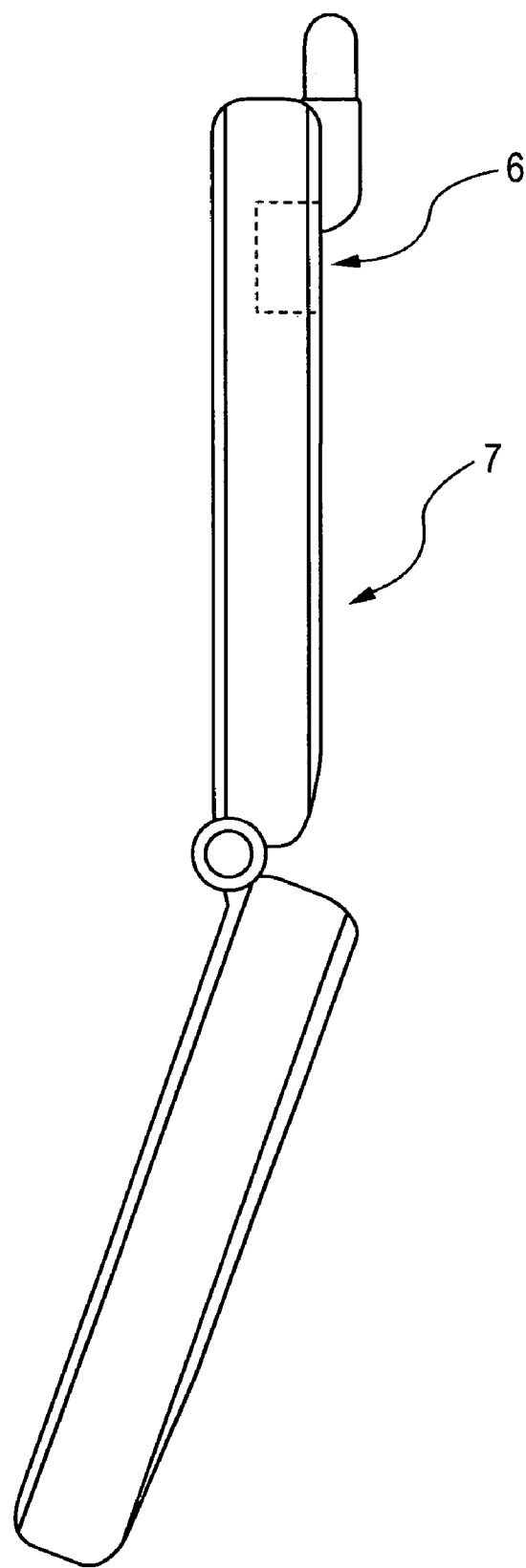
FIG. 12 is a side view of the mobile telephone shown in FIG. 11.

FIGS. 11 and 12 show a mobile telephone in which the zoom lens according to the first or second embodiment of the present invention is mounted.

The zoom lens of the embodiment is compact and light. Therefore, even when the zoom lens is mounted inside the mobile telephone, the mounting space thereof is small. This allows size reduction of the mobile telephone.

Further, since the zoom lens is compact, it can be mounted in a hinge portion of the mobile telephone.

As described above, according to the present invention, the size, thickness, weight, and cost of the zoom lens can be reduced. Therefore, the zoom lens is suitable for use not only in mobile cameras mounted in, for example, mobile telephones that are required to be compact, but also in popular digital still cameras, digital video cameras, and other lens optical systems capable of zooming.

What is claimed is:

1. A zoom lens comprising:
   a first lens unit having a negative refractive power, and including a first lens having a negative refractive power;
   a second lens unit having a positive refractive power, and including a first lens having a positive refractive power and a second lens having a negative refractive power; and
   a third lens unit having a positive refractive power, and including a first having a positive refractive power,
   wherein the first, second, and third lens units are arranged in that order from an object side to an image plane side of the zoom lens, and wherein the first lens unit is fixed and the second lens unit and the third lens unit are movable during zooming from a wide-angle end to a telephoto end, and
   wherein the following conditions (1) and (2) are satisfied:

$$4.5 < Dw1\text{-}2/Dw2\text{-}3 < 8.5 \quad (1)$$

$$Dt1\text{-}2/Dt2\text{-}3 < 0.2 \quad (2)$$

where Dw1-2 represents the distance between the first lens unit and the second lens unit at the wide-angle end, Dw2-3 represents the distance between the second lens unit and the third lens unit at the wide-angle end, Dt1-2 represents the distance between the first lens unit and the second lens unit at the telephoto end, and Dt2-3 represents the distance between the second lens unit and the third lens unit at the telephoto end.

2. The zoom lens according to claim 1, wherein the following condition (3) is satisfied:

$$fg2/fw < 1.5 \quad (3)$$

where fg2 represents the focal length of the first lens of the second lens unit, and fw represents the focal length of the zoom lens at the wide-angle end.

3. The zoom lens according to claim 2, wherein the following conditions (4) and (5) are satisfied:

$$2.5 < Dw/fw < 4.0 \quad (4)$$

$$1.0 < Dt/ft < 2.0 \quad (5)$$

where Dw represents the distance between the front surface of the first lens of the first lens unit and the image plane at the wide-angle end, Dt represents the distance between the front surface of the first lens of the first lens unit and the image plane at the telephoto end, fw represents the focal length of the zoom lens system at the wide-angle end, and ft represents the focal length of the zoom lens at the telephoto end.

4. The zoom lens according to claim 3, wherein the following conditions (6), (7), and (8) are satisfied:

$$2.0 < |fG1|/fw| < 4.0 \quad (6)$$

$$0.7 < |fG1|/ft| < 1.5 \quad (7)$$

$$0.5 < fG2/fG3 < 1.2 \quad (8)$$

where fw represents the focal length of the zoom lens system at the wide-angle end, ft represents the focal length of the zoom lens at the telephoto end, fG1 represents the focal length of the first lens unit, fG2 represents the focal length of the second lens unit, and fG3 represents the focal length of the third lens unit.

5. The zoom lens according to claim 4, wherein the first lens of the first lens unit is made of glass, and is spherical on the object side and the image plane side.

6. The zoom lens according to claim 5, wherein the first lens of the second lens unit and the second lens of the second lens unit are aspherical on both the object side and the image plane side, and the first lens of the third lens unit is aspherical on at least one of the object side and the image plane side.

7. The zoom lens according to claim 6, wherein the first lens of the second lens unit and the second lens of the second lens unit are made of resin.

8. The zoom lens according to claim 7, wherein the Abbe number v1 of the first lens of the first lens unit satisfies the following condition (9):

$$v1 > 60 \quad (9).$$

9. The zoom lens according to claim 8, wherein the following condition (10) is satisfied:

$$v2 - v3 > 20 \quad (10)$$

where v2 represents the Abbe number of the first lens lens of the second lens unit, and v3 represents the Abbe number of the second lens of the second lens unit.

10. The zoom lens according to claim 9, wherein the zoom lens is mounted in a mobile telephone.

* * * * *